United States Patent Office 2,924,612
Patented Feb. 9, 1960

2,924,612

IMPROVED PROCESS FOR PREPARING 11β-HYDROXY-FLUORO-STEROIDS

Ralph F. Hirschmann, Westfield, and Richard Miller, New Brunswick, N.J., assignors to Merck & Co., Inc., Rahway, N.J., a corporation of New Jersey No Drawing. Application December 30, 1955
Serial No. 556,426

16 Claims. (Cl. 260—397.45)

This invention is concerned generally with the production of 11-hydroxy-fluoro-steroids of the pregnane series from the corresponding steroid C-11 epoxide. More particularly, it relates to an improved method which involves reacting a steroid C-11 epoxide of the pregnane series with hydrogen fluoride to produce the corresponding 11-hydroxy-(9 or 12)-fluoro-steroid, such as $\Delta^4$-3,20-diketo-12α-fluoro-11β,17α,21-trihydroxy-pregnene, $\Delta^4$-3,20-diketo-9α-fluoro - 11β,17α,21 - trihydroxy-pregnene and $\Delta^{1,4}$-3,20-diketo-9α-fluoro-11β,17α,21-trihydroxy-pregnene, which possess extremely high local cortisone-activity and are valuable for alleviating inflammations of the skin resulting from chemical or allergic irritants or disease.

Heretofore, 11-hydroxy-fluoro-steroids of the pregnane series have been prepared by reacting the appropriate steroid C-11 epoxide with anhydrous hydrogen fluoride in chloroform or with aqueous hydrofluoric acid. Both of these methods have been, however, extremely unsatisfactory. For example, when $\Delta^4$-3,20-diketo-9,11-epoxy-17α,21-dihydroxy-pregnene is reacted with anhydrous hydrogen fluoride in chloroform, the reaction proceeds rather slowly and results in fairly low yields of impure product. Attempts have been made to accelerate the speed of the reaction and augment the yield of the desired 11-hydroxy-fluoro-steroid by conducting the reaction in an aqueous reaction medium; aqueous conditions have likewise proved unsatisfactory from a technical standpoint due to the relative insolubility of the steroid epoxide in such aqueous media.

It is now discovered, in accordance with the present invention, that the reaction between steroid C-11 epoxides and hydrogen fluoride can be effected in an anhydrous reaction medium which is a mutual solvent for the reactants, and under reaction conditions which result in a relatively rapid reaction rate and in a high yield of the desired 11-hydroxy-(9 or 12)-fluoro-steroid, by conducting the reaction in the presence of a compound formed by the reaction of hydrogen fluoride with a substance which can be characterized as a "Lewis base" in accordance with G. N. Lewis' definition of acids and bases as set forth on pages 80-81 of the text, "Advanced Organic Chemistry," by G. B. Wheland (Wiley & Sons, 2nd edition, 1949).

This reaction between hydrogen fluoride and the steroid C-11 epoxide, that is a 9,11-epoxy-steroid (Compound 1 hereinbelow) or an 11,12-epoxy-steroid (Compound 2), to produce the corresponding 11-hydroxy-fluoro-steroid (Compounds 3 and 4) may be chemically represented (insofar as the changes taking place in rings B and C are concerned) by the following chemical equations:

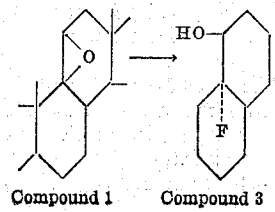

Compound 1    Compound 3

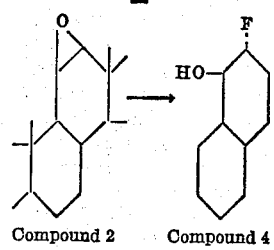

Compound 2    Compound 4

The steroid C-11 epoxides used as starting materials in this process include known compounds such as 9,11-epoxy-4-pregnene-17α,21-diol-3,20-dione; other steroid C-11 epoxides are conveniently prepared by reacting the corresponding 11-hydroxy-bromo-steroid with a base. For example, 9,11-epoxy - 1,4 - pregnadiene-17α,21-diol-3,20-dione 21-acetate is prepared by reacting 9α-bromo-1,4-pregnadiene - 11β,17α,21 - triol-3,20-dione   21-acetate with sodium methoxide in methanol; the 9α-bromo-1,4-pregnadiene-11β,17α,21-triol-3,20-dione 21-acetate may be prepared by reacting 1,4-pregnadiene-11β,17α,21-triol-3,20-dione 21-acetate with methane sulfonyl chloride to form 1,4,9(11)-pregnatriene-17α,21-diol-3,20-dione 21-acetate and reacting the latter compound with hypobromous acid. Similarly, 11β,12β-epoxy-4-pregnene-21-ol-3,20-dione is prepared by reacting 12α-bromo-4-pregnene-11β,21-diol-3,20-dione with a base such as sodium methoxide in methanol; the 12α-bromo-4-pregnene-11β,21-diol-3,20-dione may be prepared by reacting the known 12α-bromo-4-pregnene-21-ol-3,11,20-trione with excess semicarbazide to form the 3,20-bis-semicarbazone, reacting the latter with lithium borohydride to produce 12α-bromo - 4 - pregnene-11β,21-diol-3,20-dione 3,20-bis-semicarbazone, and reacting this product with a hydrolyzing agent. 11β,12β-epoxy-1,4-pregnadiene-21-ol-3,20-dione is likewise prepared by reacting 12α-bromo-1,4-pregnadiene-11β,21-diol-3,20-dione with sodium methoxide in methanol; the 12α-bromo-1,4-pregnadiene-11β,21-diol-3,20-dione may be prepared by microbiological dehydrogenation of 12α-bromo-4-pregnene-11β,21-diol-3,20-dione with *Bacillus sphaericus* microorganisms. The steroid C-11 epoxides containing a free 21-alcohol grouping such as 9,11-epoxy-1,4-pregnadiene-17α,21-diol-3,20-dione, 9,11-epoxy-4-pregnene-17α,21-diol-3,20-dione, 11β,12β-epoxy-4-pregnene - 21 - ol - 3,20-dione, 11β,12β-epoxy-1,4-pregnadiene-21-ol-3,20-dione, are reacted with an acylating agent e.g., a lower alkanoic anhydride such as acetic anhydride, propionic anhydride, a lower alkanoyl halide such as tertiary butyl-acetyl chloride, in the presence of pyridine to form the corresponding 21-ester such as 9,11-epoxy - 1,4 - pregnadiene-17α,21-diol-3,20-dione 21-acetate, 9,11-epoxy - 4 - pregnene-17α,21-diol-3,20-dione 21-propionate, 11β,12β-epoxy-4-pregnene-21-ol-3,20-dione 21-acetate, 11β,12β-epoxy-1,4-pregnadiene-21-ol-3,20-dione 21-butyrate, and the like.

In carrying out the presently invented process, the steroid C-11 epoxide and hydrogen fluoride are brought together in the presence of an organic liquid which is a solvent for both the steroid compound and the hydrogen fluoride as, for example, a halogenated hydrocarbon solvent such as chlorofor, ethylenedichloride, carbon tetrachloride, and the like, said mixture of steroid C-11 epoxide, hydrogen fluoride and organic liquid containing a minor amount of a compound formed by the reaction of hydrogen fluoride and a "Lewis base" as set forth in column 1 hereinabove. Since a "Lewis base" is defined as any substance which will act as a proton acceptor, this expression includes, in addition to the ordinary bases such as the metal hydroxides, ammonia and amines, other proton acceptors such as alcohols, ethers, ketones and the like. It is ordinarily preferred, however, to employ a Lewis base which reacts with hydrogen fluoride to form a compound which is soluble in the organic liquid utilized as the reaction medium as, for example, a lower alkanol such as methanol, ethanol, a dialkyl ether such as diethyl ether, a cyclic ether such as dioxane, tetrahydrofuran, an amine such as pyridine, and the like. While the compound formed by reacting hydrogen chloride and Lewis base can, in some instances, be added as such to the reaction mixture e.g. ammonium fluoride, hydrogen fluoride the compound formed by reaction with a very weak base such as an alcohol or ether is preferably produced in the reaction mixture by adding the base and hydrogen fluoride directly thereto. The amount of base incorporated in the reaction mixture depends upon its strength, and the optimum amount must be determined in each case; if too large a ratio of base to hydrogen fluoride is used, the acidity of the medium is reduced to such an extent that little reaction, if any, occurs, whereas if the ratio of base to hydrogen fluoride is too small, particularly in the case of weak bases such as tetrahydrofuran, the reaction proceeds with the formation of undesired by-products.

It is to be understood that the present invention contemplates the utilization, for each Lewis base, of a range of ratios of base to hydrogen fluoride which results in an acidity approximating the acidity range resulting from the optimum ratios of tetrahydrofuran and pyridine set forth hereinbelow. In the case of tetrahydrofuran we prefer to employ a ration of about 1.4 to 2 moles of hydrogen fluoride per mole of tetrahydrofuran although somewhat lower or higher ratios can be employed if desired. At a ratio below 0.4 mole hydrogen fluoride per mole of tetrahydrofuran, no fluorohydrin has been obtained, only unchanged starting epoxide having been recovered from the reaction mixture. In the case of pyridine the optimum molar ratio of hydrogen fluoride to pyridine is higher than in the case of tetrahydrofuran i.e. about 1.5 to 2.5.

The reaction is ordinarily conducted at a temperature within the range of about $-60°$ C. to $+20°$ C.; at the higher temperature, the acidity of the mixture is somewhat increased for a given ratio of hydrogen fluoride to tetrahydrofuran; since the formation of undesired by-products is reduced by employing a large proportion of Lewis base, we ordinarily conduct the reaction at temperatures below $0°$ C. and preferably at about $-30°$ C. Under these temperature conditions, the reaction is usually complete in about 4–5 hours.

The 11-hydroxy-fluoro-steroid is conveniently recovered by quenching the reaction mixture in a cold mixture of a halogenated hydrocarbon solvent such as chloroform and water (or aqueous carbonate solution) washing the organic solvent layer with aqueous alkaline solution, with aqueous acid and with water, and evaporating the solvent. The 11-hydroxy-fluorosteroid is purified by crystallization from an organic solvent e.g. acetone-petroleum ether. In accordance with this procedure there are obtained 9α-fluoro-11β-hydroxy-steroids of the pregnane series as for example, 9α-fluoro-4-pregnene-11β,17α,21-triol-3,20-dione, 9α-fluoro-1,4-pregnadiene-11β,17α,21-triol-3,20-dione, 9α-fluoro-4-pregnene-11β,21-diol-3,20-dione, 9α-fluoro-1,4-pregnadiene-11β,21-diol-3,20-dione, 9α-fluoro-4-pregnene-17α,21-diol-3,20-dione, 9α-fluoro-1,4-pregnadiene-17α,21-diol-3,20-dione, and 21-esters thereof such as 21-lower alkanoates, the 21-acetates, 21-propionates, 21-tertiary butyl-acetates, and the like, 12α-fluoro-11β-hydroxy-steroids of the pregnane series as, for example, 12α-fluoro-4-pregnene-11β,17α,21-triol-3,20-dione, 12α-fluoro-1,4-pregnadiene-11β,17α,21-triol-3,20-dione, 12α-fluoro-4-pregnene-11β,21-diol-3,20-dione, 12α-fluoro-1,4-pregnadiene-11β,21-diol-3,20-dione, 12α-fluoro-4-pregnene-17α,21-diol-3,20-dione, 12α-fluoro-1,4-pregnadiene-17α,21-diol-3,20-dione, and 21-esters thereof such as 21-lower alkanoates, the 21-acetates, 21-propionates, 21-tertiary butyl-acetates, and the like.

The following examples illustrate methods of carrying out the present invention, but it is to be understood that these examples are given for purposes of illustration and not of limitation.

Example 1

To a mixture of 20 cc. of chloroform and 60 cc. of tetrahydrofuran, cooled to $-30°$ C., is added 100 cc. of a cold ($-30°$ C.) solution of anhydrous hydrogen fluoride in isopropyl alcohol (1:1 wt./wt.). A slurry of 4.022 g. of 9,11-epoxy-4-pregnene-17α,21-diol-3,20-dione 21-acetate (M.P. 188–190° C.) in 20 cc. of cold chloroform is added and the resulting mixture is maintained at $-30°$ C. for four and one-half hours with repeated shaking. The reaction mixture is allowed to warm, over a period of one hour, to a temperature of $+16°$ C. The reaction mixture is then cooled to $-30°$ C. and then poured into 100 cc. of cold water. About 125 cc. of chloroform is added and the layers are seperated. The aqueous phase is back-extracted with two 35 cc.-portions of chloroform. The combined organic layers are washed three times with 100 cc.-portions of a 5% aqueous solution of sodium bicarbonate and twice with water. The chloroform is evaporated in vacuo, and the residual material, suspended in 5 cc. of pyridine and 3 cc. of acetic anhydride, is maintained at 65° C. in an inert atmosphere for about one hour and fifteen minutes. The bulk of the solvents are evaporated in vacuo at 60–65° C., and the residual material is distributed between 50 cc. of chloroform and 25 cc. of 1.25 N aqueous hydrochloric acid solution. The aqueous layer is back-extracted twice with 25 cc.-portions of chloroform. The combined organic layers are washed three times with 1.25 N aqueous hydrochloric acid solution, twice with water, once with a 5% aqueous solution of sodium bicarbonate, and finally twice with water. The organic layer is filtered, the filtered solution is evaporated in vacuo to a volume of about 15 cc., and the concentrated solution is adsorbed on a column of 16 g. of neutral alumina; the adsorbate is eluted with approximately 85 cc. of chloroform. The eluates are filtered, and the filtered solution is evaporated to a volume of about 8 cc.; to the concentrated solution is added 20 cc. of benzene, and the resulting mixture is allowed to stand for twenty-four hours. The precipitated material is recovered by filtration and washed twice with benzene to give about 3.3 g. of 9α-fluoro-4-pregnene-11β,17α,21-triol-3,20-dione 21-acetate. M.P. 205–207.5° C.

Example 2

A solution of 4.020 g. of 9,11-epoxy-4-pregnene-17α,21-diol-3,20-dione 21-acetate in 30 ml. of chloroform is chilled and diluted with 8 ml. of filtered tetrahydrofuran. The solution is cooled to a temperature of approximately $-40°$ C. and is added to 10 ml. of a solution of hydrogen fluoride (anhydrous) in tetrahydrofuran (ca. 2:1 wt./wt.) cooled to $-70°$ C. An additional 7 ml. of tetrahydrofuran (temperature $-30°$ C.) is used to aid in the transfer of the epoxide solution. The reaction mixture is kept at $-30°$ C. for three and one-half to four hours, and the temperature of the mixture is then allowed to rise to about $+17°$ C. over a one hour period. The reaction mixture is then cooled to a temperature of about $-30°$ C. and added slowly to a well-stirred mixture of 25 g. of anhydrous potassium carbonate dissolved in 24 ml. of water, 50 ml. of chloroform and 25 g. of ice. The layers are separated, and the aqueous layers are back-extracted with two 25-ml.-portions of chloroform. The combined organic layers are washed free of base with water. The chloroform is evaporated in vacuo, and the residual material, suspended in 5 cc. of pyridine and 3 cc. of acetic anhydride, is maintained at 65° C. in an inert atmosphere for about one hour and fifteen minutes. The bulk of the solvents are evaporated in vacuo at 60–65° C., and the residual material is distributed between 50 cc. of chloroform and 25 cc. of 1.25 N aqueous hydrochloric acid solution. The aqueous layer is back-extracted twice with 25 cc.-portions of chloroform. The combined organic layers are washed three times with 1.25 N aqueous hydrochloric acid solution, twice with water, once with a 5% aqueous solution of sodium bicarbonate, and finally twice with water. The organic layer is filtered, the filtered solution is evaporated in vacuo to a volume of about 15 cc., and the concentrated solution is adsorbed on a column of 16 g. of neutral alumina; the adsorbate is eluted with approximately 85 cc. of chloroform. The eluates are filtered, and the filtered solution is evaporated to a volume of about 8 cc.; to the concentrated solution is added 20 cc. of benzene, and the resulting mixture is allowed to stand for twenty-four hours. The precipitated material is recovered by filtration and washed twice with benzene to give about 3.3 g. of 9α-fluoro-4-pregnene-11β,17α,21-triol-3,20-dione.

*Example 3*

A solution of 4.018 g. of 9,11-epoxy-4-pregnene-17α,21-diol-3,20-dione 21-acetate in 25 ml. of chloroform is cooled to about —60° C. The solution is poured slowly into a cold (—60° C.) solution containing 6.96 g. of anhydrous hydrogen fluoride, 13.24 g. of dry tetrahydrofuran and 5 ml. of chloroform; and additional 5 ml. of chloroform (cooled to about —60° C.) is used to aid in the transfer of the epoxide solution. The resulting mixture is allowed to warm to —30° C. and maintained at that temperature for about four hours. The reaction mixture, maintained at a temperature of about —30° C., is slowly added to a well stirred mixture of 25 g. of anhydrous potassium carbonate dissolved in 24 ml. of water, 50 ml. of chloroform and 25 g. of ice. The layers are separated, and the aqueous layers are back-extracted with two 25 ml.-portions of chloroform. The combined organic layers are washed free of base with water. The chloroform is evaporated in vacuo, and the residual material, suspended in 5 cc. of pyridine and 3 cc. of acetic anhydride, is maintained at 65° C. in an inert atmosphere for about one hour and fifteen minutes. The bulk of the solvents are evaporated in vacuo at 60–65° C., and the residual material is distributed between 50 cc. of chloroform and 25 cc. of 1.25 N aqueous hydrochloric acid solution. The aqueous layer is back-extracted twice with 25 cc.-portions of chloroform. The combined organic layers are washed three times with 1.25 N aqueous hydrochloric acid solution, twice with water, once with a 5% aqueous solution of sodium bicarbonate, and finally twice with water. The organic layer is filtered, the filtered solution is evaporated in vacuo to a volume of about 15 cc., and the concentrated solution is adsorbed on a column of 16 g. of neutral alumina; the adsorbate is eluted with approximately 85 cc. of chloroform. The eluates are filtered, and the filtered solution is evaporated to a volume of about 8 cc.; to the concentrated solution is added 20 cc. of benzene, and the resulting mixture is allowed to stand for twenty-four hours. The precipitated material is recovered by filtration, washed twice with benzene, dried, and dissolved in about 30 cc. of acetone. The acetone solution is filtered, evaporated to a volume of 10 cc., 20 cc. of petroleum ether is added to the concentrated solution, and the resulting mixture is allowed to stand for a period of about 24 hours. The precipitated material is recovered by filtration, washed with a 1:3 mixture of acetone: petroleum ether, and dried to give 3.12 g. of substantially pure 9α-fluoro-4-pregnene-11β,17α,21-triol-3,20-dione 21-acetate; M.P. about 230° C. (dec.).

*Example 4*

About 19 cc. of pyridine is added cautiously to about 7 cc. of anhydrous hydrogen fluoride at a temperature of about —60° C. The mixture is allowed to warm until all solids have redissolved and to the resulting solution is added 3.9 g. of solid 9,11-epoxy-4-pregnene-17α,21-diol-3,20-dione 21-acetate. Additional amounts of anhydrous hydrogen fluoride are added with occasional cooling until an orange color persists, and the mixture is shaken at room temperature for about four hours. The reaction mixture is then cooled to —30° C. and then poured into 100 cc. of cold water. About 125 cc. of chloroform is added and the layers are separated. The aqueous phase is back-extracted with two 35 cc.-portions of chloroform. The combined organic layers are washed three times with 100 cc.-portions of a 5% aqueous solution of sodium bicarbonate and twice with water. The chloroform is evaporated in vacuo, and the residual material, suspended in 5 cc. of pyridine and 3 cc. of acetic anhydride, is maintained at 65° C. in an inert atmosphere for about one hour and fifteen minutes. The bulk of the solvents are evaporated in vacuo at 60–65° C. and the residual material is distributed between 50 cc. of chloroform and 25 cc. of 1.25 N aqueous hydrochloric acid solution. The aqueous layer is back-extracted twice with 25 cc.-portions of chloroform. The combined organic layers are washed three times with 1.25 N aqueous hydrochloric acid solution, twice with water, once with a 5% aqueous solution of sodium bicarbonate, and finally twice with water. The organic layer is filtered, the filtered solution is evaporated in vacuo to a volume of about 15 cc., and the concentrated solution is adsorbed on a column of 16 g. of neutral alumina; the adsorbate is eluted with approximately 85 cc. of chloroform. The eluates are filtered, and the filtered solution is evaporated to a volume of about 8 cc.; to the concentrated solution is added 20 cc. of benzene, and the resulting mixture is allowed to stand for twenty-four hours. The precipitated material is recovered by filtration and washed twice with benzene to give about 2–3 g. of 9α-fluoro-4-pregnene-11β,17α,21-triol-3,20-dione 21-acetate.

*Example 5*

A solution of 12.16 g. (0.0353 mole) of 9β,11β-epoxy-4-pregnene-17α-ol-3,20-dione in 106 ml. of chloroform and 33 ml. of purified tetrahydrofuran is cooled to ca. —30° C. and added to 35.3 ml. of a solution of anhydrous hydrogen fluoride (1.23 mole) in tetrahydrofuran cooled to —70° C. An additional 20 ml. of tetrahydrofuran cooled to —30° C. is used to rinse in the solution of the steroid. The reddish-purple reaction mixture is allowed to warm to —30° C. and maintained at this temperature for four hours, then allowed to warm to room temperature for one hour. The reaction mixture is cooled to 0–5° C. and poured slowly into a stirred mixture of 175 ml. of chloroform, 90 g. of ice, 170 g. (1.23 mole) of potassium carbonate and 200 ml. of water; 85 ml. of chloroform is used to rinse the reaction vessel. The neutralized reaction mixture is diluted further with 400 ml. of water, the mixture is shaken, and the layers separated. The aqueous layer is extracted with two additional portions of chloroform. The combined chloroform extracts are washed with two portions of water, filtered through a bed of anhydrous magnesium sulfate, and the solvents are evaporated in vacuo to give 13.6 g. of a crystalline material.

To this material is added 100 ml. of pyridine and 50 ml. of acetic anhydride, and the resulting mixture is heated for approximately one hour at 60–65° C. The excess pyridine and acetic anhydride is evaporated, 200 ml. of water is added to the reaction mixture, and the organic material is extracted with ethyl acetate. The ethyl acetate extracts are washed once with 1.25 N aqueous hydrochloric acid solution, once with water, once with 5% aqueous sodium bicarbonate solution, twice with water, and once with saturated salt solution. The ethyl acetate solution is then filtered through anhydrous magnesium sulfate, the solvents are evaporated in vacuo, and the residual material is recrystallized from acetone to give 6.025 g. of substantially pure 9α-fluoro-4-pregnene-11β,17α-diol-3,20-dione; M.P. 249–256° C.

*Example 6*

A solution of 600 mg. 11β,12β-epoxy-4-pregnene-21-ol- 3,20-dione 21-acetate in 6.0 ml. chloroform and 6.6 ml. tetrahydrofuran is cooled to −65° C., and the cold solution is added dropwise to 6.0 ml. of a mixture of liquid hydrogen fluoride and tetrahydrofuran (2:1 by weight) at −65° C. Three ml. chloroform cooled to −60° C. is used to wash in the last traces of steroid. The mixture is maintained at −5° C. for two hours. The reaction mixture is then cooled to −65° C. and added slowly, with stirring, to a mixture of 10 g. potassium carbonate in 50 ml. water and 50 ml. of chloroform maintained at 0° C. The layers are separated, the aqueous phase is extracted further with chloroform, and the combined chloroform extracts are washed twice with water, dried with magnesium sulfate, and evaporated to dryness in vacuo. To the residual material is added 2 ml. pyridine and 1.5 ml. acetic anhydride, and the resulting mixture is maintained at 25° C. for 18 hours. Water and chloroform are added to the reaction mixture, the aqueous phase is extracted with chloroform, and the combined chloroform extracts are washed with aqueous potassium carbonate and water, dried with magnesium sulfate, and evaporated to dryness in vacuo. The residual material is crystallized from acetone-ether to give 12α-fluoro-4-pregnene-11β,21-diol-3,20-dione 21-acetate as a cluster of prisms; M.P. 197–200° C.

*Example 7*

A solution of 3.00 g. of 9β,11β-epoxy-1,4-pregnadiene-17α,21-diol-3,20-dione 21-acetate in 18 ml. of chloroform is cooled to about −60° C. The solution is poured slowly into a cold (−60° C.) solution containing 5.0 ml. of tetrahydrofuran, 3.75 ml. of chloroform, and 7.45 ml. of a solution of hydrogen fluoride in tetrahydrofuran (2:1 by weight); an additional 3.75 ml. of cold chloroform is used to aid in the transfer of the epoxide solution. The solution is maintained at −60° C. for about 5 minutes and then kept at about 0° C. for three and one-half hours. The red reaction mixture is recooled to −60° C., then poured slowly, and with constant stirring, into a mixture of 20 g. of anhydrous potassium carbonate dissolved in 18 ml. of cold water, 20 g. of ice and 38 ml. of cold chloroform. Additional amounts of solid potassium carbonate are added during the quench to keep the pH above 7. The final pH of the mixture is about 9. The chloroform layer is separated from the resulting mixture, and the aqueous layers are back-extracted with two 20 cc. portions of chloroform. The combined organic layers are washed twice with water and with a saturated salt solution. The chloroform solution is evaporated in vacuo on a hot waterbath and finally on a steambath in a current of nitrogen to a volume of about 10 ml. About 25 ml. of benzene is added to the concentrated solution, and the mixture is allowed to stand for about two hours. The light buff crystals which separate are washed with benzene and dried to give .2–3 g. of 9α-fluoro-1,4-pregnadiene-11β,17α,21-triol-3,20-dione 21-acetate; yield approximately 74% of theory.

*Example 8*

A solution of 3.00 g. of 11β,12β-epoxy-1,4-pregnadiene-17α,21-diol-3,20-dione 21-acetate in 18 ml. of chloroform is cooled to about −60° C. The solution is poured slowly into a cold (−60° C.) solution containing 5.0 ml. of tetrahydrofuran, 3.75 ml. of chloroform, and 7.45 ml. of a solution of hydrogen fluoride in tetrahydrofuran (2:1 by weight); an additional 3.75 ml. of cold chloroform is used to aid in the transfer of the epoxide solution. The solution is maintained at about −60° C. for about five minutes and then kept at about 0° C. for three and one-half hours. The red reaction mixture is recooled to −60° C., and then poured slowly, and with constant stirring, into a mixture of 20 g. of anhydrous potassium carbonate dissolved in 18 ml. of cold water, 20 g. of ice and 38 ml. of cold chloroform. Additional amounts of solid potassium carbonate are added during the quench to keep the pH above 7. The final pH of the mixture is about 9. The chloroform layer is separated from the resulting mixture, and the aqueous layers are back-extracted with two 20 cc. portions of chloroform. The combined organic layers are washed twice with water and with a saturated salt solution. The chloroform solution is evaporated in vacuo on a hot waterbath and finally on a steambath in a current of nitrogen to a volume of about 10 ml. About 25 ml. of benzene is added to the concentrated solution, and the mixture is allowed to stand for about two hours. The light buff crystals which separate are washed with benzene and dried to give 12α-fluoro-1,4-pregnadiene-11β,17α,21-triol-3,20-dione 21-acetate.

Various changes and modifications may be made in carrying out the present invention without departing from the spirit and scope thereof. Insofar as these changes and modifications are within the purview of the annexed claims, they are to be considered as part of this invention.

We claim:

1. In the process of preparing an 11β-hydroxy-fluoro-steroid of the pregnane series by the reaction of hydrogen fluoride with the corresponding steroid 9,11- and 11,12-epoxides, the improvement which comprises conducting said reaction under anhydrous conditions in solution with a compound formed by the reaction of hydrogen fluoride and an organic Lewis base.

2. In the process of preparing a 9α-fluoro-11β-hydroxy-steroid of the pregnane series by the reaction of hydrogen fluoride with the corresponding 9,11-epoxy-steroid, the improvement which comprises conducting said reaction under anhydrous conditions in solution with a compound formed by the reaction of hydrogen fluoride and an organic Lewis base.

3. In the process of preparing an 11β-hydroxy-12α-fluoro-steroid of the pregnane series by the reaction of hydrogen fluoride with the corresponding 11,12-epoxy-steroid, the improvement which comprises conducting said reaction under anhydrous conditions in solution with a compound formed by the reaction of hydrogen fluoride and an organic Lewis base.

4. The process which comprises reacting hydrogen fluoride with a 9,11-epoxy-4-pregnene under anhydrous conditions in a halogenated hydrocarbon solvent, and in solution with a compound formed by the reaction of hydrogen fluoride and an organic Lewis base, said compound being soluble in said solvent, thereby producing the corresponding 9α-fluoro-4-pregnene-11β-ol.

5. The process which comprises reacting hydrogen fluoride with an 11,12-epoxy-4-pregnene under anhydrous conditions in a halogenated hydrocarbon solvent, and in solution with a compound formed by the reaction of hydrogen fluoride and an organic Lewis base, said compound being soluble in said solvent, thereby producing the corresponding 12α-fluoro-4-pregnene-11β-ol.

6. The process which comprises reacting hydrogen fluoride with a 9,11-epoxy-1,4-pregnadiene under anhydrous conditions in a halogenated hydrocarbon solvent, and in solution with a compound formed by the reaction of hydrogen fluoride and an organic Lewis base, said compound being soluble in said solvent, thereby producing the corresponding 9α-fluoro-1,4-pregnadiene-11β-ol.

7. The process which comprises reacting hydrogen fluoride with an 11,12-epoxy-1,4-pregnadiene under anhydrous conditions in a halogenated hydrocarbon solvent, and in solution with a compound formed by the reaction of hydrogen fluoride and an organic Lewis base, said compound being soluble in said solvent, thereby producing the corresponding 12α-fluoro-1,4-pregnadiene-11β-ol.

8. In the process of preparing 9α-fluoro-4-pregnene-11β,17α,21-triol-3,20-dione by the reaction of hydrogen fluoride with 9,11-epoxy-4-pregnene-17α,21-diol-3,20-dione, the improvement which comprises conducting said reaction under anhydrous conditions in solution with a compound formed by the union of hydrogen fluoride with an organic Lewis base.

9. In the process of preparing 9α-fluoro-4-pregnene-

11β,17α-21-triol-3,20-dione by the reaction of hydrogen fluoride with 9,11-epoxy-4-pregnene-17α,21-diol-3,20-dione in a halogenated hydrocarbon solvent, the improvement which comprises conducting said reaction under anhydrous conditions in solution with a compound, soluble in said solvent, which is formed by the union of hydrogen fluoride with an organic Lewis base.

10. In the process of preparing 9α-fluoro-1,4-pregnadiene-11β,17α,21-triol-3,20-dione by the reaction of hydrogen fluoride with 9,11-epoxy-1,4-pregnadiene-17α,21-diol-3,20-dione in a halogenated hydrocarbon solvent, the improvement which comprises conducting said reaction under anhydrous conditions in solution with a compound, soluble in said solvent, which is formed by the union of hydrogen fluoride with an organic Lewis base.

11. In the process of preparing 9α-fluoro-4-pregnene-11β,17α,21-triol-3,20-dione 21-acetate by the reaction of hydrogen fluoride with 9,11-epoxy-4-pregnene-17α,21-diol-3,20-dione 21-acetate in chloroform, the improvement which comprises conducting said reaction under anhydrous conditions in solution with the compound formed by the union of hydrogen fluoride with tetrahydrofuran.

12. In the process of preparing 9α-fluoro-1,4-pregnadiene-11β,17α,21-triol-3,20-dione 21-acetate by the reaction of hydrogen fluoride with 9,11-epoxy-1,4-pregnadiene-17α,21-diol-3,20-dione 21-acetate in chloroform, the improvement which comprises conducting said reaction under anhydrous conditions in solution with the compound formed by the union of hydrogen fluoride with tetrahydrofuran.

13. In the process of preparing 9α-fluoro-4-pregnene-11β,17α,21-triol-3,20-dione 21-acetate by the reaction of hydrogen fluoride with 9,11-epoxy-4-pregnene-17α,21-diol-3,20-dione 21-acetate, the improvement which comprises conducting said reaction under anhydrous conditions in solution with pyridinium fluoride.

14. In the process of preparing 9α-fluoro-4-pregnene-11β,17α-diol-3,20-dione by the reaction of hydrogen fluoride with 9β,11β-epoxy-4-pregnene-17α,21-diol-3,20-dione in a halogenated hydrocarbon solvent, the improvement which comprises conducting said reaction under anhydrous conditions in solution with a compound, soluble in said solvent, which is formed by the union of hydrogen fluoride with an organic Lewis base.

15. In the process of preparing 12α-fluoro-4-pregnene-11β,21-diol-3,20-dione 21-acetate by the reaction of hydrogen fluoride with 11β,12β-epoxy-4-pregnene-21-ol-3,20-dione 21-acetate in a halogenated hydrocarbon solvent, the improvement which comprises conducting said reaction under anhydrous conditions in solution with a compound, soluble in said solvent, which is formed by the union of hydrogen fluoride with an organic Lewis base.

16. In the process of preparing 12α-fluoro-1,4-pregnadiene-11β,17α,21-triol-3,20-dione 21-acetate by the reaction of hydrogen fluoride with 11β,12β-epoxy-1,4-pregnadiene-17α,21-diol-3,20-dione 21-acetate in a halogenated hydrocarbon solvent, the improvement which comprises conducting said reaction under anhydrous conditions in solution with a compound, soluble in said solvent, which is formed by the union of hydrogen fluoride with an organic Lewis base.

References Cited in the file of this patent

UNITED STATES PATENTS

| | | |
|---|---|---|
| 2,730,525 | Hogg | Jan. 10, 1956 |
| 2,763,671 | Fried et al. | Sept. 18, 1956 |
| 2,782,211 | Wettstein et al. | Feb. 19, 1957 |
| 2,852,511 | Fried | Sept. 16, 1958 |

OTHER REFERENCES

Fried et al.: Jour. Am. Chem. Soc., 76: 1455–1456 (1954).